US009130899B1

(12) United States Patent
Baird et al.

(10) Patent No.: US 9,130,899 B1
(45) Date of Patent: Sep. 8, 2015

(54) INTEGRATED USER INTERFACE FOR UNIFIED COMMUNICATIONS APPLICATIONS

(75) Inventors: Randall B. Baird, Austin, TX (US);
Liam P. O'Gorman, Limerick (IE);
Stephan E. Friedl, Frederick, CO (US);
J. Steven Mayer, LeRoy, NY (US); Joe Smyth, Newcastle (IE)

(73) Assignee: Cisco Technology, Inc., San Jose, CA (US)

( * ) Notice: Subject to any disclaimer, the term of this patent is extended or adjusted under 35 U.S.C. 154(b) by 1004 days.

(21) Appl. No.: 13/094,897

(22) Filed: Apr. 27, 2011

(51) Int. Cl.
*G06F 15/16* (2006.01)
*H04L 29/08* (2006.01)
*G06F 17/30* (2006.01)

(52) U.S. Cl.
CPC .......... *H04L 67/02* (2013.01); *G06F 17/30861* (2013.01)

(58) Field of Classification Search
USPC ........................................................ 709/203
See application file for complete search history.

(56) References Cited

U.S. PATENT DOCUMENTS

| | | | |
|---|---|---|---|
| 6,226,642 B1 | 5/2001 | Beranek et al. | |
| 6,389,462 B1 | 5/2002 | Cohen et al. | |
| 6,738,804 B1 | 5/2004 | Lo | |
| 7,568,056 B2 | 7/2009 | Danilak | |
| 7,681,134 B1 | 3/2010 | Grechishkin et al. | |
| 7,899,864 B2 | 3/2011 | Margulis | |
| 8,135,616 B2 | 3/2012 | Callaghan et al. | |
| 8,352,875 B2 | 1/2013 | Peltz et al. | |
| 8,374,113 B2 | 2/2013 | Meier et al. | |
| 8,549,087 B2 * | 10/2013 | Leonard .................... 709/206 | |
| 8,782,124 B2 | 7/2014 | Clark et al. | |
| 2003/0051070 A1 | 3/2003 | Shappir et al. | |
| 2003/0142127 A1 | 7/2003 | Markel | |
| 2006/0005187 A1 | 1/2006 | Neil | |
| 2006/0104259 A1 | 5/2006 | Caballero-McCann et al. | |
| 2006/0230105 A1 | 10/2006 | Shappir et al. | |
| 2006/0230156 A1 | 10/2006 | Shappir et al. | |

(Continued)

FOREIGN PATENT DOCUMENTS

WO     WO 0057612 A2 * 9/2000

OTHER PUBLICATIONS

Cisco VXI: An End-to-End Virtualization System BRKVIR-2010.*

(Continued)

*Primary Examiner* — Tauqir Hussain
(74) *Attorney, Agent, or Firm* — Edell, Shapiro & Finnan, LLC

(57) ABSTRACT

Techniques are provided for establishing a Unified Communications (UC) session between a client endpoint device and remote endpoint devices, the client endpoint device managing the session using a first-party call control protocol in response to commands from a third-party control protocol and user input. A hosted virtual desktop (HVD) generates an HVD image and communicates it to the client endpoint device for display, via a virtual desktop interface (VDI) protocol. The HVD image comprises a UC user interface generated by a UC application on the HVD, the user interface comprising at least one user interface element and at least one placeholder where a client-provided user interface element may be inserted. A client UC application receives the HVD image and inserts client-provided user interface elements over the placeholders before sending the integrated image to a client operating system to be rendered on the display of client endpoint device.

23 Claims, 13 Drawing Sheets

(56) References Cited

U.S. PATENT DOCUMENTS

| | | |
|---|---|---|
| 2006/0230438 A1 | 10/2006 | Shappir et al. |
| 2007/0005365 A1* | 1/2007 | Goodman et al. ............ 704/270 |
| 2007/0018992 A1 | 1/2007 | Wong |
| 2007/0116246 A1 | 5/2007 | Walker et al. |
| 2008/0037516 A1* | 2/2008 | Cai ............................... 370/352 |
| 2009/0021583 A1 | 1/2009 | Salgar et al. |
| 2009/0181702 A1* | 7/2009 | Vargas et al. ................. 455/466 |
| 2009/0248802 A1 | 10/2009 | Mahajan et al. |
| 2009/0249216 A1 | 10/2009 | Charka et al. |
| 2009/0287772 A1 | 11/2009 | Stone et al. |
| 2010/0042718 A1 | 2/2010 | Morris |
| 2010/0138744 A1 | 6/2010 | Kamay et al. |
| 2010/0146504 A1 | 6/2010 | Tang |
| 2010/0153544 A1 | 6/2010 | Krassner et al. |
| 2010/0169281 A1* | 7/2010 | Atluri et al. ................... 707/641 |
| 2010/0303061 A1* | 12/2010 | Wan et al. ..................... 370/352 |
| 2011/0010615 A1 | 1/2011 | Dees et al. |
| 2011/0126110 A1 | 5/2011 | Vilke et al. |
| 2011/0184918 A1* | 7/2011 | Atluri et al. ................... 707/683 |
| 2012/0054744 A1 | 3/2012 | Singh et al. |
| 2012/0084774 A1 | 4/2012 | Post et al. |
| 2012/0092438 A1* | 4/2012 | Guzman Suarez et al. ........................... 348/14.03 |
| 2012/0110131 A1 | 5/2012 | Villagas Nunez et al. |
| 2012/0226985 A1 | 9/2012 | Chervets et al. |
| 2012/0226998 A1 | 9/2012 | Friedl et al. |
| 2012/0246554 A1 | 9/2012 | Shappir |
| 2012/0284632 A1 | 11/2012 | Baird et al. |
| 2012/0331127 A1 | 12/2012 | Wang et al. |
| 2013/0007150 A1* | 1/2013 | Hertz et al. ................... 709/206 |
| 2013/0013664 A1 | 1/2013 | Baird et al. |
| 2013/0024906 A9 | 1/2013 | Camey et al. |
| 2013/0067374 A1* | 3/2013 | Dantec et al. ................. 715/769 |

OTHER PUBLICATIONS

Cisco Data Sheet, "Cisco Unified Survivable Remote Site Telephone Version 4.1," 2008.
Greenberg, et al., "Adaptive Offloading for Pervasive Computing," IEEE Pervasive Computing, vol. 3, No. 3, Jul.-Sep. 2004, pp. 66-73.
HDX™ Technologies, www.hdx.citrix.com, printed May 11, 2011, 2 pages.
Wyse Thin Computing Software, Delivering the best experience over virtualized desktop environments, Summary Data, www.wyse.com, © 2010, 9 pages.
Kerner, Sean Michael, "Riverbed Accelerates UDP with RiOS 7," Dec. 5, 2011, 1 page.
Interdigital, "Video-Aware Link Adaption," White Paper, www.interdigital.com, Oct. 2012, pp. 1-8.
Ericom, "Ericom Blaze, A Breakthrough in RDP Acceleration and Compression," http://www.ericom.com/specs/Ericom_Blaze.pdf, retrieved Oct. 2013, 2 pages.

* cited by examiner

INTEGRATED USER INTERFACE FOR UNIFIED COMMUNICATIONS APPLICATIONS

TECHNICAL FIELD

The present disclosure relates generally to Unified Communications (UC), and more particularly to providing an integrated user interface for UC applications on a client endpoint device.

BACKGROUND

The field of UC is a growing technology that unifies various forms of human communication via a device into a common user experience. UC may integrate real-time communications services such as instant messaging and presence, telephony, and video conferencing with other communications services such as voicemail, email, facsimile, and short messaging services. UC also attempts to achieve media independence. For example, an individual may be in a meeting and receive a call that cannot be accepted during the meeting. Sometime later, a voicemail notification is received, but the voicemail may not be retrievable by a phone call without disrupting the meeting. UC techniques allow the individual to receive a text version of the voicemail on a handheld device that was converted to text by a voice recognition tool. In this way, UC can increase human productivity by reducing communications latency.

UC may be virtualized, that is, the UC application may run in a hosted virtual desktop (HVD) while the user interface for the application is displayed on a remote client endpoint device. Virtualized UC presents a set of unique problems in that media such as audio and video may be more difficult to virtualize than simple text and graphics.

UC sessions are organized into calls, similar to ordinary telephony calls. The protocols to establish these calls can either be first-party call control protocols, where one of the endpoints participating in the call requests changes to the call state directly, or third-party call control protocols, where an entity that is not one of the endpoints participating in the call requests changes to the call state on behalf of one or more of the endpoints participating in the call. In third-party call control, the protocol used to request call state changes is sometimes referred to as a computer telephony interface (CTI).

DESCRIPTION OF EXAMPLE EMBODIMENTS

Overview

Techniques are provided herein for establishing a Unified Communications (UC) session between a client endpoint device and remote endpoint devices, where the client endpoint device manages the session using a first-party call control protocol, in response to commands from a third-party control protocol and user input. A hosted virtual desktop (HVD) generates an HVD image and communicates it to the client endpoint device for display, via a virtual desktop interface (VDI) protocol. The HVD image comprises a UC user interface generated by a UC application on the HVD, the user interface comprising at least one user interface element and at least one placeholder where a client-provided user interface element may be inserted. A client UC application receives the HVD image, including the UC user interface, and inserts client-provided user interface elements into the placeholders before sending the integrated image to a client operating system to be rendered on the display of client endpoint device. The HVD image may also comprise images of the virtual desktop and other applications.

Example Embodiments

Various examples are provided of methods, apparatuses, and computer readable media encoded with instructions for creating, managing and displaying an integrated user interface for UC applications on a client endpoint device. The user interface integrates user interface elements rendered by a HVD, and user interface elements provided and rendered by a client endpoint device.

Figure 1:
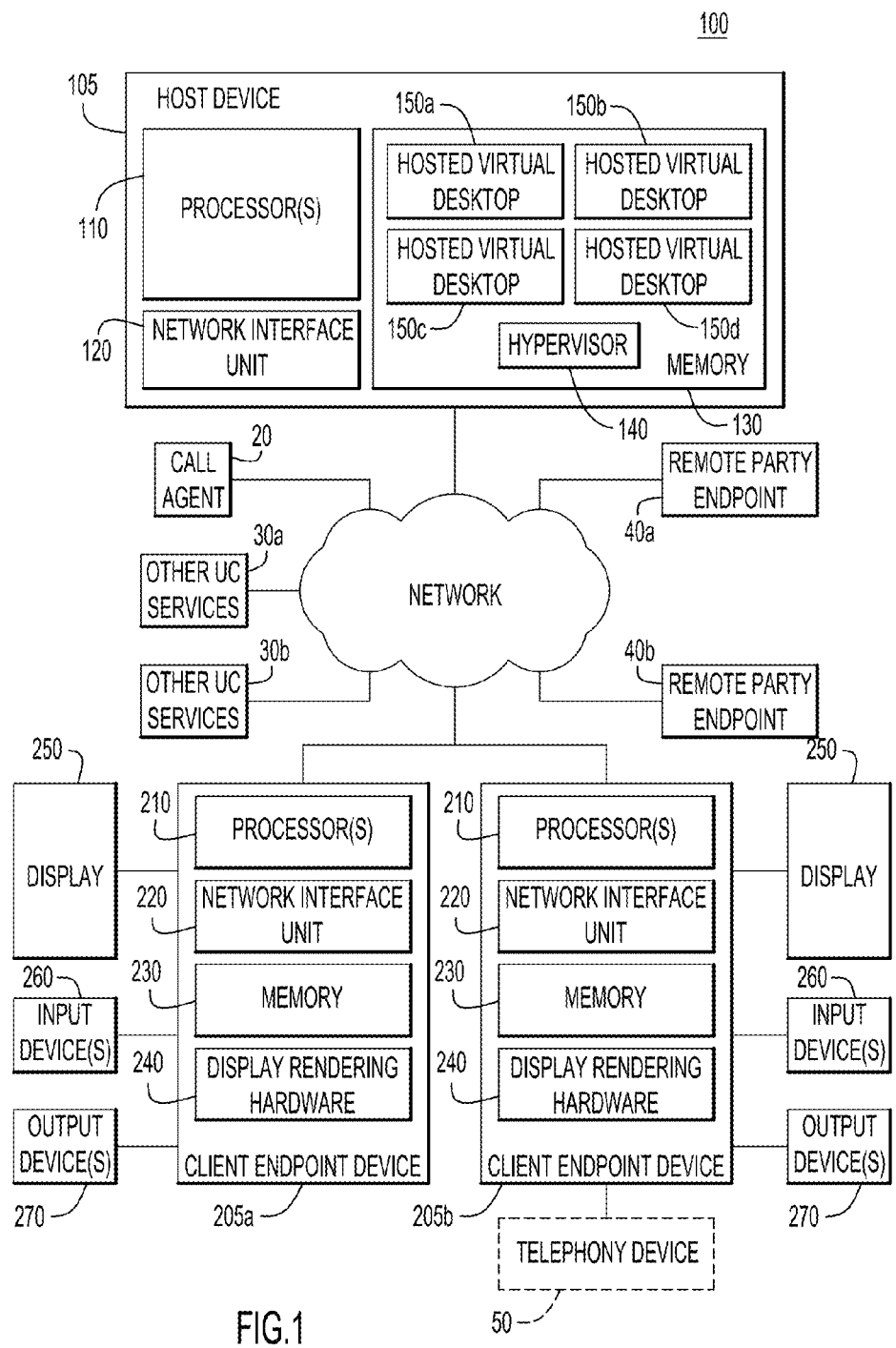
FIG. 1 is an example of a block diagram showing a UC environment in which UC connectivity can be established between client endpoint devices and remote party endpoints under the control of one or more hosted virtual desktops.

Referring now to the Figures, an example of a block diagram showing a UC environment in which UC connectivity can be established between client endpoint devices and remote party endpoints under the control of one or more hosted virtual desktops is shown in FIG. 1. The depicted UC environment 100 includes host device 105, client endpoint devices 205a, 205b, call agent 20, other UC services 30a, 30b, and remote party endpoints 40a, 40b, which are connected over network 10 to each other. The UC environment may include additional servers, clients, and other devices not shown, and individual components of the system may occur either singly or in multiples, for example, there may be more than one host device 105, and other networking components, e.g., routers and switches, may be used in the UC environment 100.

Network 10 represents any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the UC environment 100 may include any conventional or other communications devices to communicate over the networks via any conventional or other protocols, and may utilize any type of connection (e.g., wired, wireless, etc.) for access to the network.

Call agent 20 is a primary call agent or media gateway controller for controlling a UC call (e.g., a video conference call), signaling among the various endpoints in the UC environment 100. Other UC services modules 30a, 30b represent agents for other UC communications types, e.g., instant messaging and presence, voicemail, email, and gateways for PSTN, facsimile, and short messaging services.

Remote party endpoints 40a, 40b may be any suitable telephony device such as a soft phone on a desktop computer, a plain old telephone system (POTS) device, cellular phone, private branch exchange (PBX) device, video incapable phone, or any other suitable telephony device.

Figure 2:
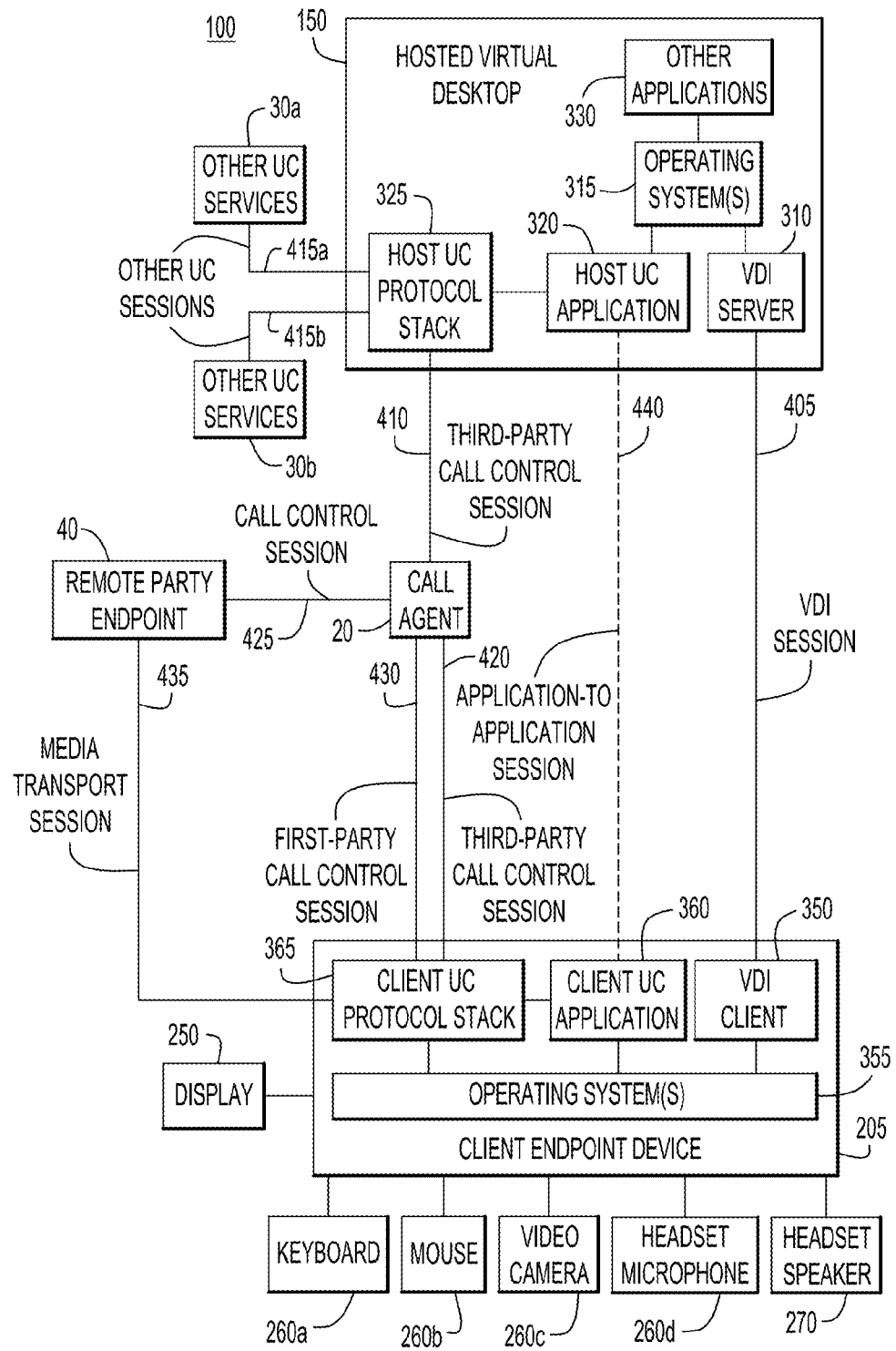
FIG. 2 is an example of a block diagram showing virtual desktop interface (VDI), UC control, and audio/video streaming sessions among a particular hosted virtual desktop (HVD), client endpoint device, and remote party endpoint in the UC environment.

Host device 105 comprises one or more processors 110, a network interface unit 120, and memory 130. The processor 110 is, for example, a data processing device such as a microprocessor, microcontroller, systems on a chip (SOCs), or other fixed or programmable logic, that executes instructions for process logic stored in memory 130. The network interface unit 120 enables communication throughout the UC environment, as shown in FIGS. 1 and 2. Memory 130 may be implemented by any conventional or other memory or storage device, and may include any suitable storage capacity. For example, memory 130 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 130 may comprise one or more computer readable storage media (e.g., a memory device) encoded with software comprising computer executable instructions and when the software is executed (by processor 110) it is operable to perform the operations described herein in connection with FIG. 7.

The host device 105 may be, for example, a computing blade, a blade server comprising one or more solid state drives, or a blade center comprising one or more blade servers together with a blade chassis comprising common resources such as networking connections, input/output device connections, power connections, cooling devices, switches, etc. The host device 105 may be a component of a larger system, such as a Cisco Unified Computing System, or a data center that centralizes enterprise computing resources.

Resident in memory 130 are hypervisor 140, and multiple hosted virtual desktops (HVDs) 150a-d. The hypervisor or virtual machine monitor 140 presents a virtual operating platform to the HVDs 150a-d, and manages access to the host processor 110, network interface unit 120, memory 130 and other host resources, so that the HVDs 150a-d have access to appropriate host resources without disrupting each other's operation. Each HVD 150 operates independently of the other HVDs 150 and runs as a separate virtual machine on the host device 105, and each HVD 150 may run a different operating system if desired. Further operation of the HVDs is explained below with reference to FIGS. 2-7.

Each example client endpoint device 205a comprises one or more processors 210, a network interface unit 220, memory 230, and display rendering hardware 240. The processor 210 is, for example, a data processing device such as a microprocessor, microcontroller, systems on a chip (SOCs), or other fixed or programmable logic, that executes instructions for process logic stored in memory 230. The network interface unit 220 enables communication throughout the UC environment, as shown in FIGS. 1 and 2. Memory 230 may be implemented by any conventional or other memory or storage device, and may include any suitable storage capacity. For example, memory 230 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 230 may comprise one or more computer readable storage media (e.g., a memory device) encoded with software comprising computer executable instructions and when the software is executed (by processor 210) it is operable to perform the operations described herein in connection with FIGS. 8 and 9. Display rendering hardware 240 may be a part of processor 210, or may be, e.g., a separate graphics processor, e.g., a Graphics Processor Unit (GPU).

The example client endpoint device 205 may be any conventional or other computer system or device, such as a thin client, computer terminal or workstation, personal desktop computer, laptop or netbook, tablet, cellular phone, set-top box, networked television, or other device capable of acting as a client in the described UC environment. The client endpoint device 205 may be used alone, or in conjunction with optional telephony device 50, which may be, for example, a telephony headset, plain old telephone system (POTS) device, cellular phone, private branch exchange (PBX) device, video incapable phone, or any other suitable telephony device.

The example client endpoint device 205 interfaces with display device 250, input device(s) 260, and output device(s) 270, and communicates with these devices in any suitable fashion, e.g., via a wired or wireless connection. The display device 250 may be any suitable display, screen or monitor capable of displaying information to a user of a client endpoint device, for example the screen of a tablet or the monitor attached to a computer workstation. Input device(s) 260 may include any suitable input device, for example, a keyboard, mouse, trackpad, touch input tablet, touch screen, camera, microphone, remote control, speech synthesizer, or the like. Output device(s) 270 may include any suitable output device, for example, a speaker, headphone, sound output port, or the like.

The display device 250, input device(s) 260 and output device(s) 270 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device. If the client endpoint device 205 is used in conjunction with telephony device 50, then the components of the telephony device 50 may be used as input and/or output devices. For example, if telephony device 50 is a PBX video-incapable device having a keypad and a standard telephone handset having a microphone and a speaker, then the client endpoint device 205 may accept input via the keypad and the handset microphone, display video on display screen 250, and output audio to the handset speaker.

The functions of the processors 110 and 210 may each be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memories 130 and 230 each store data used for the computations or functions described herein (and/or to store software or processor instructions that are executed to carry out the computations or functions described herein). Alternatively, one or more computer readable storage media are provided and encoded with software comprising computer executable instructions and when the software is executed operable to performing the techniques described herein. Thus, functions of the process logic as described with reference to FIGS. 7 through 9, for example, may be implemented with fixed logic or programmable logic (e.g., software or computer instructions executed by a processor or field programmable gate array (FPGA)).

FIG. 2 is an example of a block diagram showing virtual desktop interface (VDI), UC control, and audio/video streaming sessions among a HVD 150, client endpoint device 205, and remote party endpoint 40 in the UC environment 100. For purposes of simplification, the other components of the UC environment 100, e.g., other client endpoint devices, are not shown here. Further, although the description refers to the interaction between one HVD 150 and one client endpoint device 205, it is understood by those skilled in the art that each HVD 150 may interact with one or more client endpoint devices 205, and each client endpoint device 205 may interact with one or more HVDs 150 on a single or multiple host devices 105. Moreover, there may be more than one call agent in the UC environment 100, for example a backup call agent in addition to the (primary) call agent 20, or other arrangement to provide for survivable remote site telephony (SRST), for example.

The example HVD 150 comprises a VDI server 310, host operating system(s) 315, host UC application 320, host UC protocol stack 325, and may also comprise one or more other application(s) 330. The VDI server 310 may be a standalone process as depicted, or it may be implemented as part of another process, for example it may be partially implemented in hypervisor 140. The example client endpoint device 205 comprises a VDI client 350, operating system(s) 355, client UC application 360, and client UC protocol stack 365, all of which reside in memory 230 (as shown in FIG. 1), and also comprises a display 250, input devices including keyboard 260a, mouse 260b, digital video camera 260c and headset microphone 260d, and output devices including headset speaker 270. The client UC protocol stack 365 may also be referred to as a UC client software stack, e.g., a Client Services Framework (CSF) stack.

The VDI server 310 interacts with the VDI client to provide virtual desktop interface functionality to the client endpoint device 205 over VDI session 405, which is a VDI protocol link that is established using any suitable VDI protocol, for example Microsoft Remote Desktop Protocol (RDP), Citrix Systems Independent Computing Architecture (ICA), VMWare PC over IP (PCoIP), or other suitable protocol. For example, some applications with which a user of the client endpoint device 205 is interacting are hosted by the HVD 150, while the user interface, e.g. a graphical user interface (GUI), associated with the application(s) is rendered by the client endpoint device 205. The user interface is depicted and further described with reference to FIGS. 4 and 5. The VDI server 310 on the host may, for example, receive display output generated by applications 320 and 330, via the host operating system 315, and send it as a VDI image to the VDI client 350 over VDI session 405.

The VDI image comprises image information associated with a hosted virtual display (HVD) display, which the client endpoint device 205 may modify and render for display as a client endpoint display on display device 250. The HVD display comprises a UC user interface, which when rendered for display at the client endpoint device 205 enables a user to manage a UC call session between the client endpoint device 205 and a remote endpoint device 40. The HVD display may also comprise one or more windows for hosted applications 330 and a graphical representation of a desktop environment. The UC user interface, as is further described with reference to FIGS. 4 and 5, comprises at least one host-provided user interface element, and at least one placeholder where a client-provided user interface element may be inserted.

The VDI client 350 interacts with client operating system 355 to render the received HVD display for display on the client endpoint device 205. As will be further described with reference to FIGS. 4 and 5, the client UC application 360 and/or the client UC protocol 365 may also interact with the client operating system 355 to modify the received HVD display, for example by commanding the operating system 355 to insert client-provided user interface elements into the placeholder(s) in the HVD display, prior to rendering it for display on display device 250. The VDI client 350 also receives user input from the user interface, for example, the user types on keyboard 260a or exercises mouse 260b, and these inputs are translated by the VDI client 350 and sent to the VDI server 310 via VDI session 405.

After it receives the user input, VDI server 310 translates it into virtual keyboard and mouse inputs, and feeds it via host operating system 315 to host UC application 320 or other applications 330, as if the applications and the input devices 260 were running on a single desktop computing device. The user inputs are processed by the appropriate application at the HVD, and user interface (e.g., a GUI) information is generated through the operating system 315 and VDI server 310 for transmission back to the VDI client 350, which renders the user interface for display to the user on display 250. Other I/O associated with other applications 330, e.g., image inputs from digital camera 260c and voice inputs from microphone 260d that are unrelated to a UC session may be processed in a similar fashion.

In another embodiment, host device 105 may execute hosted virtual applications (HVAs) from its memory 130, rather than full hosted virtual desktops 150. In this embodiment, the memory 130 comprises the VDI server 310, OS 315, host UC application 320, host UC protocol stack 325, etc. In this HVA embodiment, client endpoint device 205 may use its VDI client 350 to interact with multiple host devices 105, each executing one or more HVAs, and use the client operating system 355 to composite the output of the HVAs to present a full windowed desktop on display 250. For example, instead of receiving a single HVD display, the client endpoint device 205 may receive multiple HVA displays, each HVA display corresponding to one HVA, including an HVA display corresponding to the UC application and comprising the UC user interface. The client endpoint display is then generated by compositing all of the received HVA displays together, and rendering the client-provided user interface element(s) into the appropriate placeholder(s).

The host UC application 320, for example Cisco Systems' Cisco Unified Personal Communicator (CUPC) or similar application, operates in conjunction with host UC protocol stack 325 to establish and control UC sessions between the client endpoint device 205 and a UC endpoint such as remote party endpoint 40. UC protocol stack 325 is configured to manage UC sessions in a third-party call control mode. For a UC call session, e.g., a videoconference, the host UC application 320 sends call control requests to the host UC protocol stack 325, which sends call control signals to call agent 20 over third-party call control session 410. The call agent 20 sends UC protocol commands based on the third-party call control signals, e.g., signals associated with call set-up, tear down, or mid-call control, to client UC protocol stack 365 over third-party call control session 420. The client UC protocol stack 365, in response to the third-party call control signals, makes first-party call control requests back to the call agent 20 over first-party call control session 430, which result in signals being sent to remote party endpoint 40 over call control session 425.

The third-party call control signals may be in any suitable protocol, for example Computer Telephony Integration (CTI), CTI-QBE (Quick Buffer Encoding) protocol, or the like. Thus, in an embodiment where CTI is used, the host UC application 320 and the UC protocol stack 325 act as the CTI master, and the client UC protocol stack 365 is a CTI slave. It will be appreciated that remote party endpoint 40 may be controlled either through first-party or third-party call control signaling. The UC protocol commands may be sent via any suitable protocol, for example the Session Initiation Protocol (SIP), Skinny Call Control Protocol (SCCP), or the ITU H.323. The first-party and third-party call control requests may be sent via any suitable protocol, for example SIP. In one embodiment, the call agent 20 commands the client UC protocol stack 365 to perform third-party-initiated actions over third-party call control session 420 via SIP with embedded Remote Call Control (remoteCC) bodies, and first-party requests are initiated by the client protocol stack 365 over first-party call control session 430.

Using call control sessions 425 and 430, call agent 20 mediates the exchange of media capabilities between client UC protocol stack 365 and remote party endpoint 40, allowing media transport session 435 to be established directly between remote party endpoint 40 and client endpoint 205. The client UC protocol stack 365 and the remote party endpoint 40 communicate media data associated with the UC call session to each other via media transport session 435, without the communication data passing through the HVD 150. The media data may be, for example, rich media data such as audio and/or video data, and may be encoded or compressed in any suitable fashion, for example using UC voice and video codecs, and transmitted via any suitable protocol, for example the Real-time Transport Protocol (RTP).

As compared to conventional methods that route media flowing from remote party endpoints through the HVD and over a VDI session to the client endpoint, the present embodiments use the media transport session 435 to directly transport media data between the UC session endpoints. This direct transportation of media to client endpoint devices has several benefits. First, using the media transport session 435 consumes less network bandwidth because it can use specialized transport protocols such as RTP that suffer less from delay and jitter than transporting media over the VDI session 405. Second, use of the media transport session 435 allows for Quality of Service (QoS) differentiation between regular VDI services and UC media. Third, transmitting communication data directly between the UC endpoints avoids needless concentration of bandwidth at a centralized location such as a host device 105 where multiple HVDs may be located. Fourth, using the media transport session 435 avoids placing high media encode/decode computing loads on the HVD, and thus avoids scalability problems on the HVD devices. Also, because the VDI session 405, call control sessions 410, 420, 425, 430 and media transport sessions 435 are separate from each other, different network paths may be used for VDI communication, call signaling, and media transmission.

In one embodiment, an application-to-application session 440 is established between the host UC application 320 and the client UC application 360. The application-to-application session 440 may be used to communicate any desired information between the two UC applications, for example user interface geometry information such as metadata that describes the size and location of some user interface elements in the HVD display, identity information that enables the client UC application 360 to register the client endpoint device 205 with the call agent 20, configuration information, or call state and client endpoint state information, for example call state and client endpoint state information that cannot otherwise be communicated via the third-party call control sessions 410, 420. The user interface geometry information, e.g., metadata, may, for example, indicate the position and size of each host-provided user interface element and placeholder in the HVD display, and/or the position and size of each client-provided user interface element and placeholder in the HVD display. The application-to-application session 440 (also referred to as an inter-application session) may be established using any suitable protocol, for example as a virtual channel within the VDI session 405, and in another embodiment the inter-application session 440 may be transported independently using HTTP, TLS, or TCP.

In other embodiments where the inter-application session 440 is not utilized, the information that would be transmitted via the inter-application session 440 may be transmitted in a different manner, for example a call control protocol may be chosen to permit information such as configuration information to be transmitted via the third-party call control sessions 410, 420, or for example, the VDI session 405 may be used to transmit VDI images.

The various operating systems mentioned with reference to FIG. 1 and FIG. 2, such as the host operating system(s) 315 and the client operating system(s) 355 may be any suitable operating system for use in the UC environment 100, such as, for example, a FreeBSD, Linux, OS X, UNIX, Windows, or other operating system. The operating system may be a standard operating system, an embedded operating system, or a real-time operating system. For example, the host operating system 315 may be a Windows operating system such as Windows 7 or Windows Server 2008 R2, a Linux operating system such as Ubuntu or Red Hat Enterprise Linux, or a Macintosh operating system such as OS X or OS X Server. The client operating system 355 may be, for example, Linux, Blackberry OS, OS X, Windows, or other operating system. In one embodiment, the client operating system 355 is a Linux-derived operating system, such as Android, MeeGo, ThinStation, Ubuntu, webOS, or the like. In another embodiment, the client operating system 355 is a FreeBSD operating system, such as OS X, iOS, or the like, or a Windows operating system, such as Windows 7, Windows CE, Windows Vista, Windows XP, or Windows XPe.

Figure 3A:
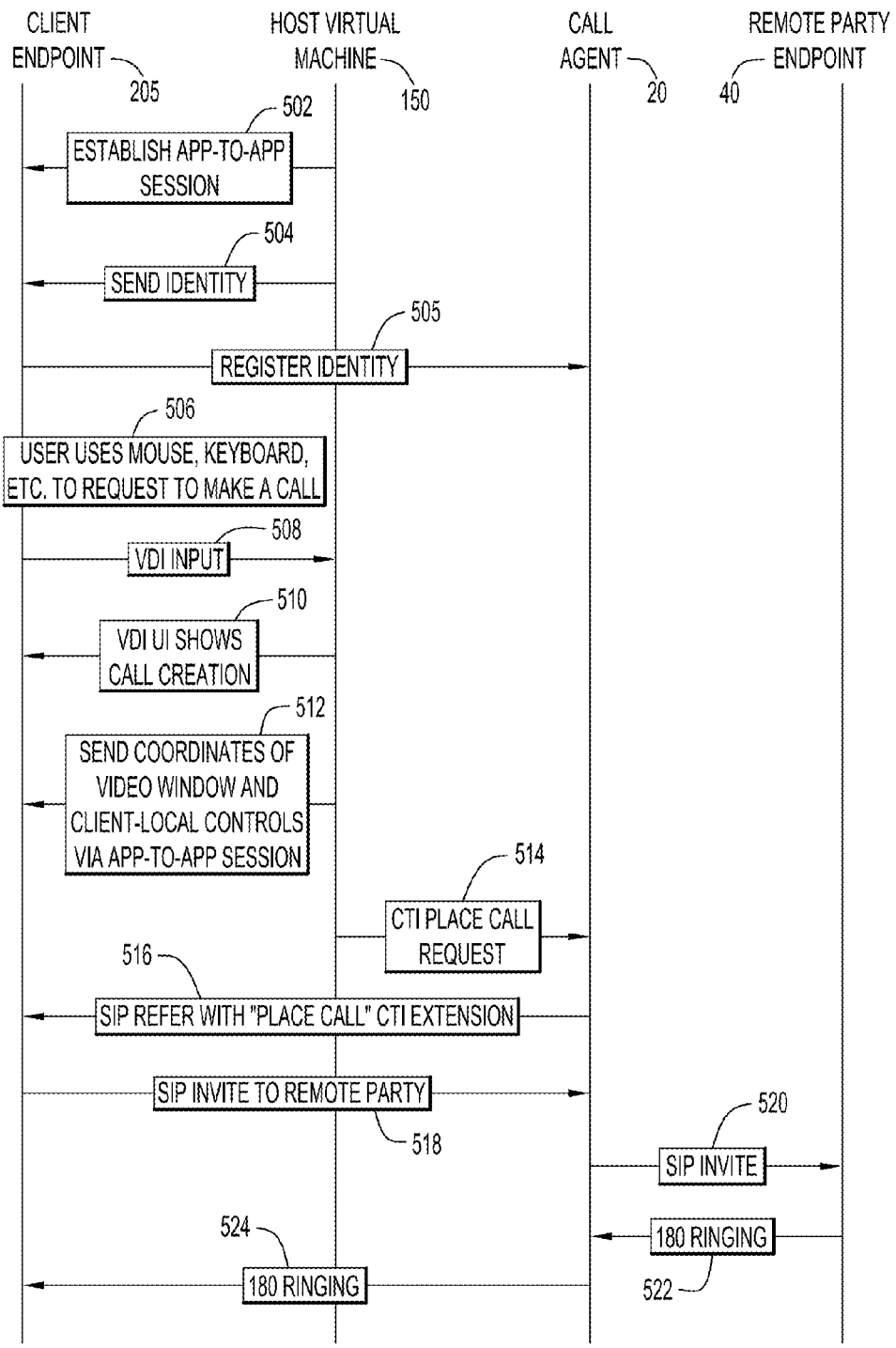
FIGS. 3A and 3B are an example of a call flow in which an application-to-application session is established between the HVD and the client endpoint device, and a UC call session is established between a client endpoint device and a remote party endpoint.
Figure 3B:
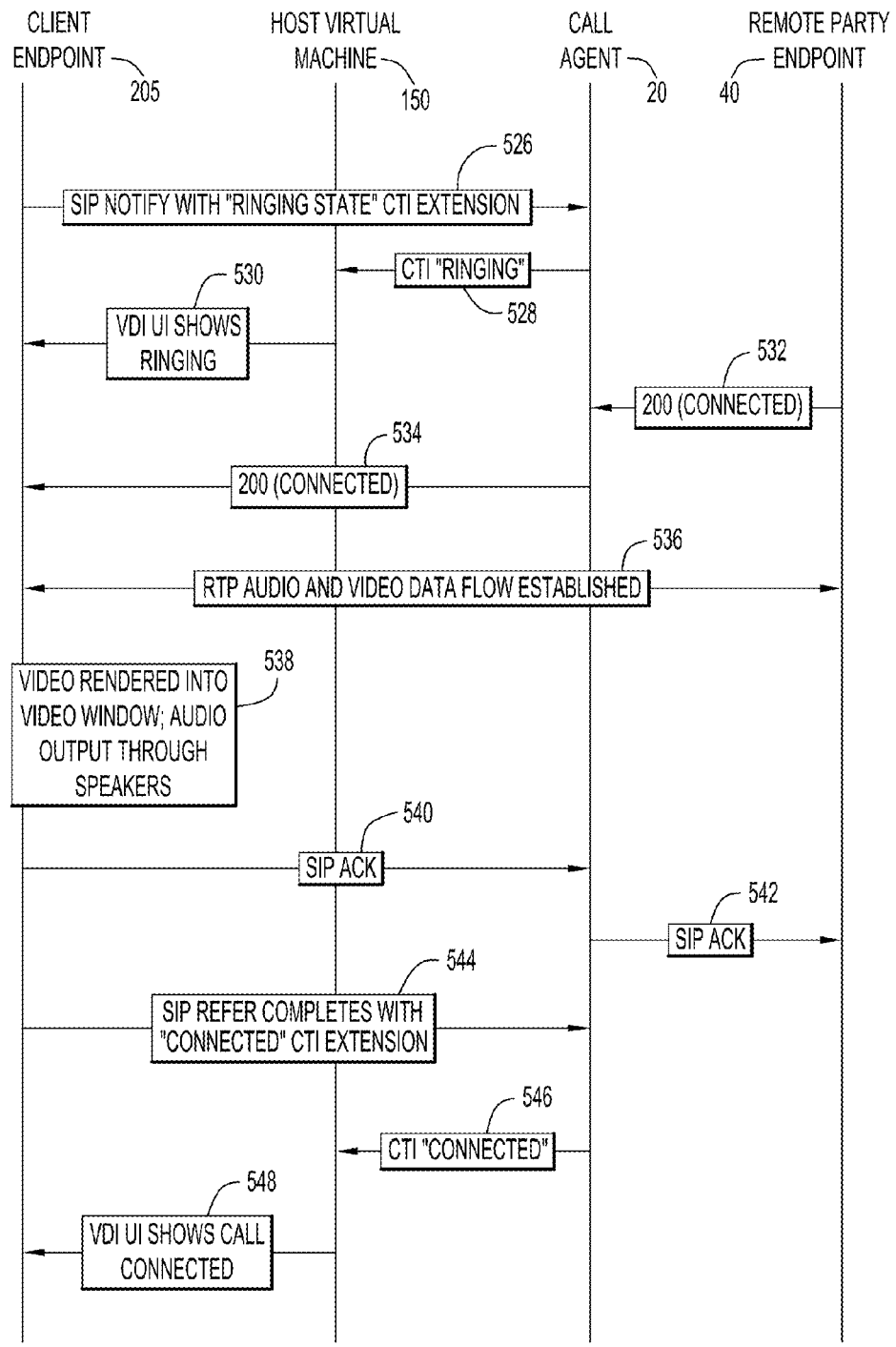

FIGS. 3A and 3B are an example of a call flow in which the call control, application-to-application, and VDI sessions described in FIG. 1 have been established between the HVD 150, the client endpoint device 205, the call agent 20, and the remote party endpoint 40, also described in FIG. 1. Although the call flow is described with reference to the SIP and CTI protocols, it is understood that any suitable protocol may be used with the appropriate adjustments to one or more steps, and also that some of the steps depicted have been elided in the interests of simplicity and conciseness. It is also understood that although the call flow depicts the use of an application-to-application session, such a session is not required to be used.

In FIG. 3A, the HVD 150 at step 502 establishes the application-to-application session 440 with the client endpoint device 205, and in step 504 sends identity information to the client endpoint via the application-to-application session so that the client endpoint can register with the call agent 20 at step 505. Throughout this description, the establishment of an association between the client UC protocol stack 365 and the call agent 20 is referred to as "registration." Such registration can take many forms and should not be construed as requiring any specific form of connection establishment or endpoint identification. In step 506, the user of the client endpoint device 205 uses an input device such as a mouse, keyboard, or the like to request to make a call, and in step 508 the user input is translated and sent as VDI input over the VDI session from the client endpoint 205 to the HVD 150.

In step 510, after the host UC application 320 has changed its GUI to reflect the ongoing call creation process, the VDI server 310 on HVD transmits the GUI updates over VDI session 405, for example as a new HVD display, causing VDI client 350 to use the operating system 355 to update the user interface rendered on display 250. In step 512, the HVD 150 sends via the application-to-application session 440 the user interface geometry information, e.g., the coordinates of the various host- and client-provided user interface elements in the HVD display, for example, the coordinates to be used by the client endpoint 205 for a video window and client local controls. In step 514, the UC protocol stack 325 on HVD 150 sends a CTI place call request to the call agent 20, and in step 516 the call agent 20 sends a SIP REFER request with a "place call" in a remoteCC CTI extension to the client endpoint 205. In step 518, the client endpoint 205 sends a first-party SIP INVITE request to the call agent 20, and at step 520 the call agent 20 sends the SIP INVITE request onward to the remote party endpoint 40. The remote party endpoint 40 sends a SIP response 180 (ringing) back to the call agent 20 at step 522, and in step 524 the call agent 20 forwards the SIP response 180 (ringing) to client endpoint 205.

Continuing in FIG. 3B, in step 526 the client endpoint 205 sends a SIP NOTIFY request with a "ringing state" remoteCC CTI extension to the call agent 20, and in step 528 the call agent 20 sends a CTI "ringing" response to the HVD 150, which causes the UC host application 320 to update the GUI to reflect that the call is ringing. In step 530, the VDI server reflects the GUI changes across VDI session 405. In step 532, the remote party endpoint 40 connects the call, for example by a remote user picking up the handset or otherwise accepting the call, and sends a SIP response 200 (connected) to the call agent 20, and in step 534 the call agent sends the SIP response 200 (connected) to client endpoint 205.

In step 536, based on information carried in the previous SIP messages, RTP media transfer sessions 435 are established to start the flow of audio and video data between the client endpoint 205 and the remote party endpoint 40, and in step 538 video is rendered in the UC user interface video window, and audio is output through speakers or another audio output device. It will be appreciated that, although not shown explicitly audio and video also are captured by headset microphone 260d and video camera 260c, encoded, and sent in RTP media transfer session 435 from client endpoint device 205 to remote party endpoint 40. In step 540, the client endpoint 205 sends a SIP ACK request to the remote party, which is routed to call agent 20, and at step 542 the call agent 20 sends the SIP ACK request onward to the remote party endpoint 40. In step 544 the SIP REFER request from step 516 is completed with a "connected" remoteCC CTI extension and sent to the call agent 20, and in step 546 the call agent 20 sends the HVD a CTI "connected" message. In step 548 GUI updates from host UC application 320 are transmitted over VDI session 405 and reflected on the display 250.

Figure 4A:
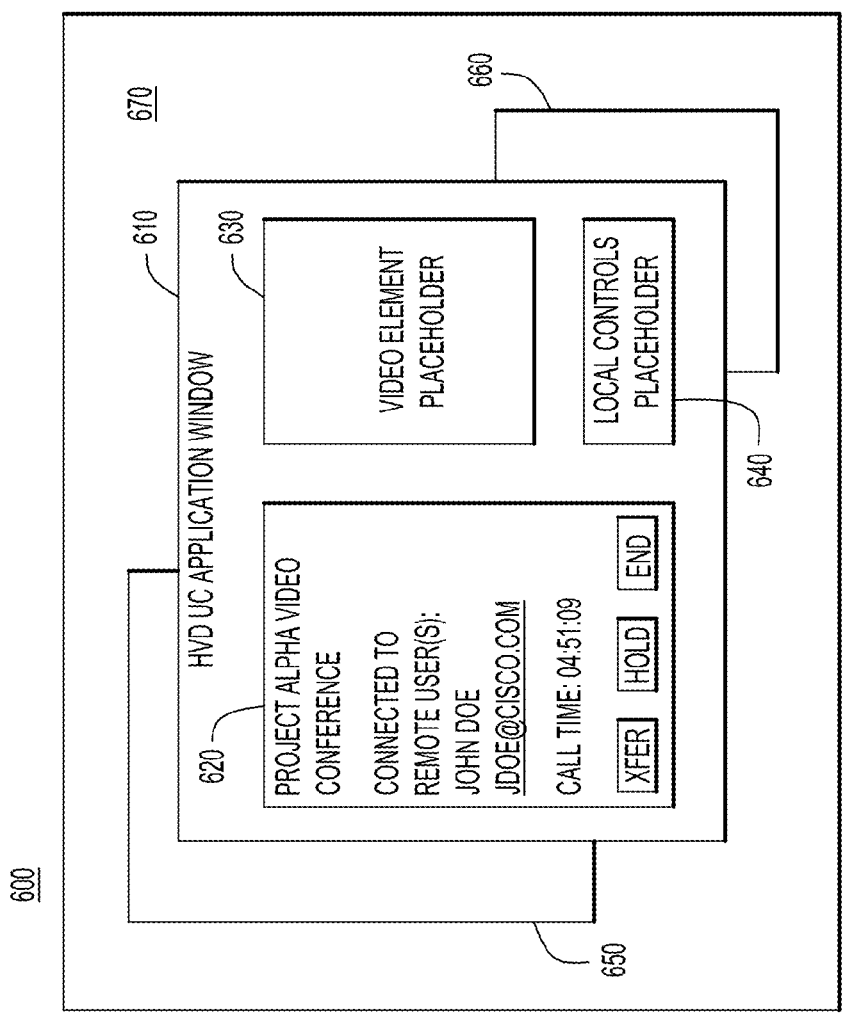
FIG. 4A is an example of a HVD display including a UC user interface generated by a UC application running on the HVD, including user interface elements generated by the UC application and placeholders for user interface elements to be rendered by the client endpoint device.

FIG. 4A is an example of an HVD display 600. It will be appreciated that HVD display 600 is a virtual display, and the depicted representations of the graphical user interface (GUI) elements in the display do not necessarily comprise a simple bitmap of the display. In a Microsoft Windows HVD, the GUI elements may be represented by Graphics Device Interface (GDI) drawing commands and/or Direct3D graphics commands. VDI server 310 may further process these representations to enable their transmission over VDI session 405.

HVD display 600 comprises an HVD UC application window 610 comprising a UC user interface, here depicted as a graphical user interface (GUI) generated by the HVD UC application 320, where the UC user interface comprises at least one user interface element 620 that is generated by the HVD UC application 320 and at least one placeholder 630, 640 where client endpoint device 205 may render a user interface element. The HVD display 600 may also comprise windows 650, 660 drawn by other HVD applications, and HVD background desktop image 670 which serves as the background image for the HVD display 600. The UC user interface enables a user to manage the UC call session by, e.g., initiating, conducting, and terminating the UC call session via the UC user interface.

In the example depicted, element 620 is generated by the HVD UC application 320 and contains information about an ongoing session and controls for transferring, placing on hold, or terminating the session. It will be understood that other controls may also be drawn and managed by application 320. Application 320 also draws a placeholder window 640 reserving visual space where client-generated local controls may be inserted as user interface elements, but it should be understood that local controls are not required, and are simply an option that may be desired for certain implementations. The controls may be provided locally for various reasons, for example if the third-party call control protocols used do not support a particular function (e.g., escalation/de-escalation of video) or if performance may be enhanced by locating the control close to the media (e.g., audio/video mute/unmute, volume control, camera control, etc.). Application 320 also draws placeholder window 630, so that visual space is reserved for a video image, which will be rendered into the allocated placeholder by the client endpoint device 205.

Figure 4B:
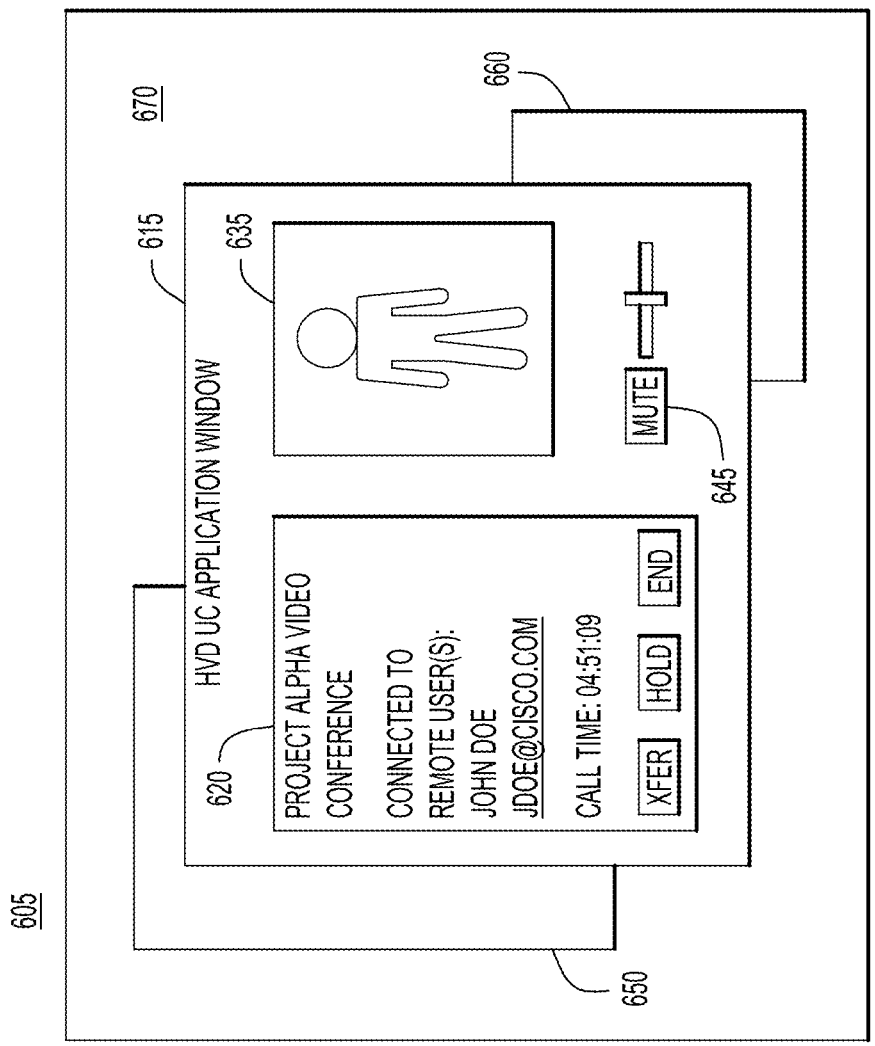
FIG. 4B is an example of a client endpoint display including a modified HVD display in which the UC user interface placeholders have been replaced with client-provided content.

FIG. 4B is an example of a client endpoint display 605 comprising a modified HVD display. When the client endpoint device 205 receives an HVD display such as HVD display 600 from the HVD 150, via VDI session 405, the client endpoint device generates the client endpoint display 605 by rendering both the HVD display 600, using VDI client 350, and the client-provided user interface elements that have been generated by the client UC protocol stack 365 or by the client UC application 360 into the placeholder windows 630, 640 of the UC user interface window 615 of the HVD display. For example, local controls placeholder 640 has been replaced by mute button and volume control slider 645. It will be understood that other local controls may be rendered to provide alternate, locally-executed functions. Video element placeholder 630 has been replaced by video element 635, which is rendered to the display 605 by either the client UC protocol stack 365 or the client UC application 360. It should be understood that the depicted controls and user interface elements are only examples and are not required to be used in any implementation. The end result is a composited UC user interface window 615 comprising the host-provided user interface elements 620 that are rendered by the HVD UC application 320 and the client-provided user interface elements 635, 645 that are rendered by the client endpoint device 205.

It will be understood that a similar process takes place for UC audio. Client endpoint device 205 may receive audio, comprising, for example, application tones, music, or voice alerts, from HVD 150, via VDI session 405. Client endpoint device 205 may also receive UC audio from remote party endpoint 40, via media transport session 435. Client endpoint device 205 should combine the audio from these two sources and render a coherent audio waveform to headset speaker 270. The two sources may, for example, be mixed by operating system 355, using audio rendering hardware in client endpoint device 205.

Figure 5A:
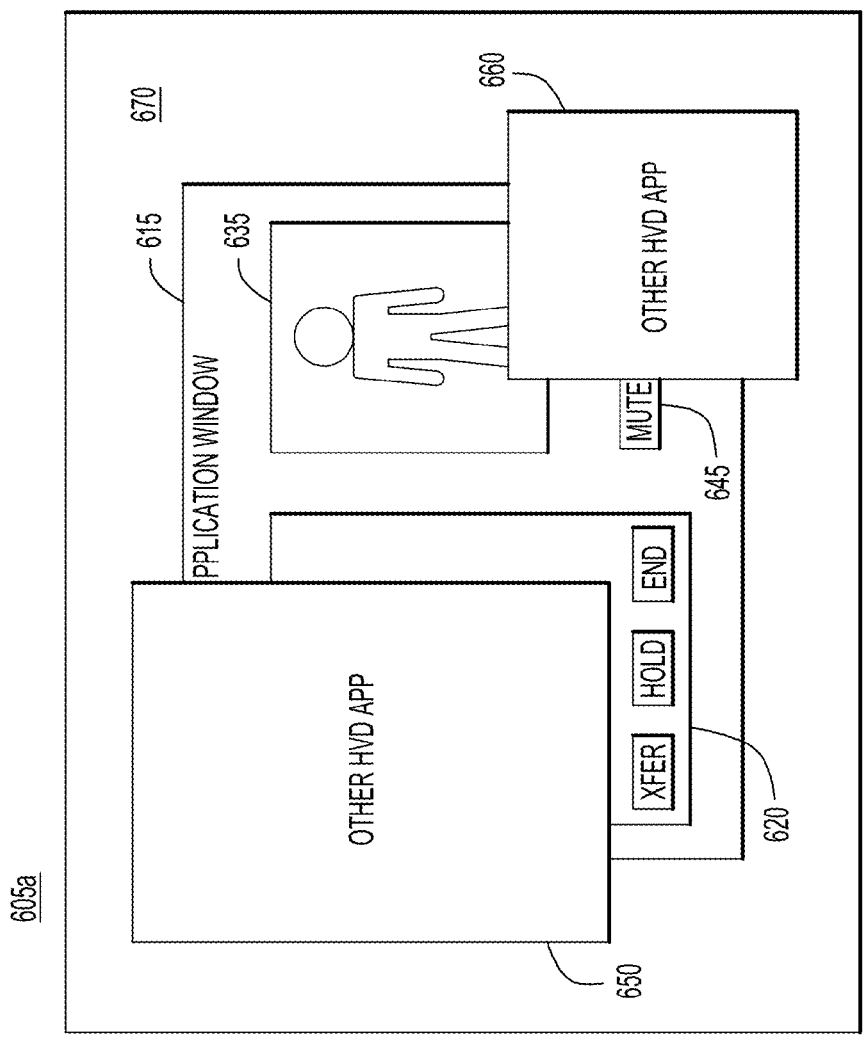
FIG. 5A is an example of a client endpoint display in which the UC user interface has been partially occluded by images of other HVD applications.
Figure 5B:
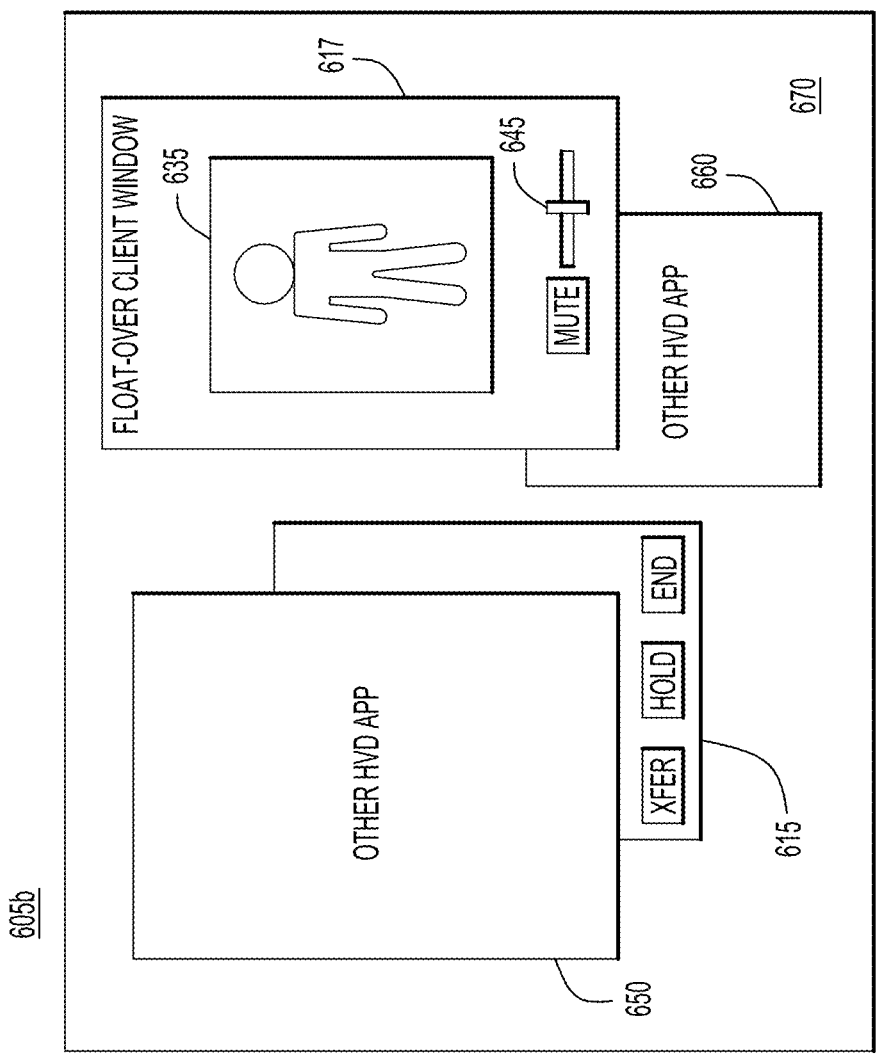
FIG. 5B is an example of an alternate client endpoint display in which another embodiment of the UC user interface device displays the client-rendered portions of the UC user interface as a float-over client window that is displayed in front of the entire HVD display.

FIGS. 5A and 5B are alternative examples of client endpoint displays 605a, 605b in which the user has requested that other HVD application windows 650 and 660 be brought to the foreground, partially occluding UC application window 615. Because the VDI server 310 composites all applications on the HVD 150 into a single HVD display, which is then communicated to the client endpoint device 205, placeholder windows 630 and 640 may not be simple rectangles, implying that the compositing of client user elements 635 and 645 cannot be accomplished by requesting that client operating system 355 render a simple set of rectangles on top of the VDI image, as was the case in FIG. 4B.

In particular, it is the responsibility of the client operating system 355 to accomplish compositing. In most windowed operating systems, compositing is accomplished by the operating system drawing each individual window according to a z-order, which describes the relative depth of the various windows. Windows with the deepest (lowest) z-order are drawn first, and then each window with a successively shallower (higher) z-order is drawn subsequently, which may result in the deeper windows being partially or fully occluded on the display. The assignment of higher-valued integers to shallower windows is somewhat arbitrary, but higher z-order shall herein be understood to imply shallower windows, i.e., windows stacked closer to the user's eyes.

It should be appreciated, however, that the VDI client 350 receives all virtual display information (i.e., the HVD display comprising UC application window 615 with placeholder windows, other HVD application windows 650 and 660, and the HVD background desktop image 670) from VDI session 405 and requests the client operating system 355 to render the entire virtual display as a single rectangular window. Thus, although window 650 or 660 may have a higher z-order on the HVD than the UC application window 615, the client endpoint device 205 (e.g., client UC protocol stack 365 or client UC application 360) may composite the video window 635 and/or the client user controls 645 so that the composited images have a higher z-order than the HVD display. The client endpoint device 205 creates the appearance that these user elements 635, 645 are partially occluded, however, by compositing the video window 635 and/or the client user controls 645 in only the non-occluded portions of the placeholder windows 630 and 640. This means that, for example as shown in FIG. 5a, these client user interface elements should be rendered as non-rectangular shapes, for example, in FIG. 5a, the client user element 635 has been rendered into an irregular hexagonal placeholder window due to the occlusion of the lower right corner by the window 660. FIG. 5A shows a fully composited display 605a, with composited non-rectangular video image 635 and partially occluded user control 645.

To efficiently render display 605a, the client operating system 355 should be able to accept requests to render non-rectangular images without interfering with the images on the rest of the display. UC client application 360 should therefore be able to be informed of the non-rectangular geometry, so that this information may be communicated to the operating system 355. In one example, the host UC application 320 interacts with HVD operating system 315 to compute the geometry of the non-occluded portions of the placeholders and communicates that information to the client UC application 360 over the application-to-application session 440. In another example, host UC application fills placeholder windows 630 and 640 with a unique chromakey color, so that UC client application 360 may compute the non-rectangular region by detecting what portions of the virtual display contain the chromakey color. Operating system 355 should also be able to render the non-rectangular images at high speed and at a low impact to the CPU of the client endpoint device 205. In one example of such an efficient rendering, operating system 355 is aware of display rendering hardware 240, which comprises, for example, a graphics processing unit (GPU) capable of rendering non-rectangular images.

It will be appreciated that such non-rectangular rendering is likely to occur when the HVD 150 uses the VDI session 405 to sends entire HVD displays. If the client endpoint 205 receives multiple hosted virtual applications (HVAs) from multiple VDI sessions, then the VDI client 350 may render each HVA as a separate rectangular window. In this case, as long as the client UI elements 635, 645 are rendered into the placeholders 630, 640 during or immediately after the rendering of the HVA comprising UC application window 615, subsequent rendering of other HVAs comprising, for example apps 650, 600, will properly occlude the portions of client element 635 and 645.

FIG. 5B depicts an example of an alternate display 605b, wherein the host UC application 320 is either unaware of the client-rendered portions of the application or unable to compute the geometry of the non-occluded portions of the placeholders; the client OS 355 is unable to render non-rectangular images; or the client endpoint 205 lacks display rendering hardware 240 to efficiently render the non-rectangular images.

In the embodiment depicted in FIG. 5B, the video image 635 and the client-rendered user controls 645 are consolidated into a separate float-over window 617. Client UC application requests that operating system 355 always render this window on top of the virtual display image rendered by VDI client 350. In other words, float-over window 617 always has a higher z-order than the HVD display from VDI client 350. In this embodiment, clicking on either the first or second window 650, 660 to make it the active window will not bring it to a higher z-order than the float-over window 617, however the user can move the windows 617, 650, 660 to different areas of display 605b to uncover the window desired to be viewed.

Figure 6:
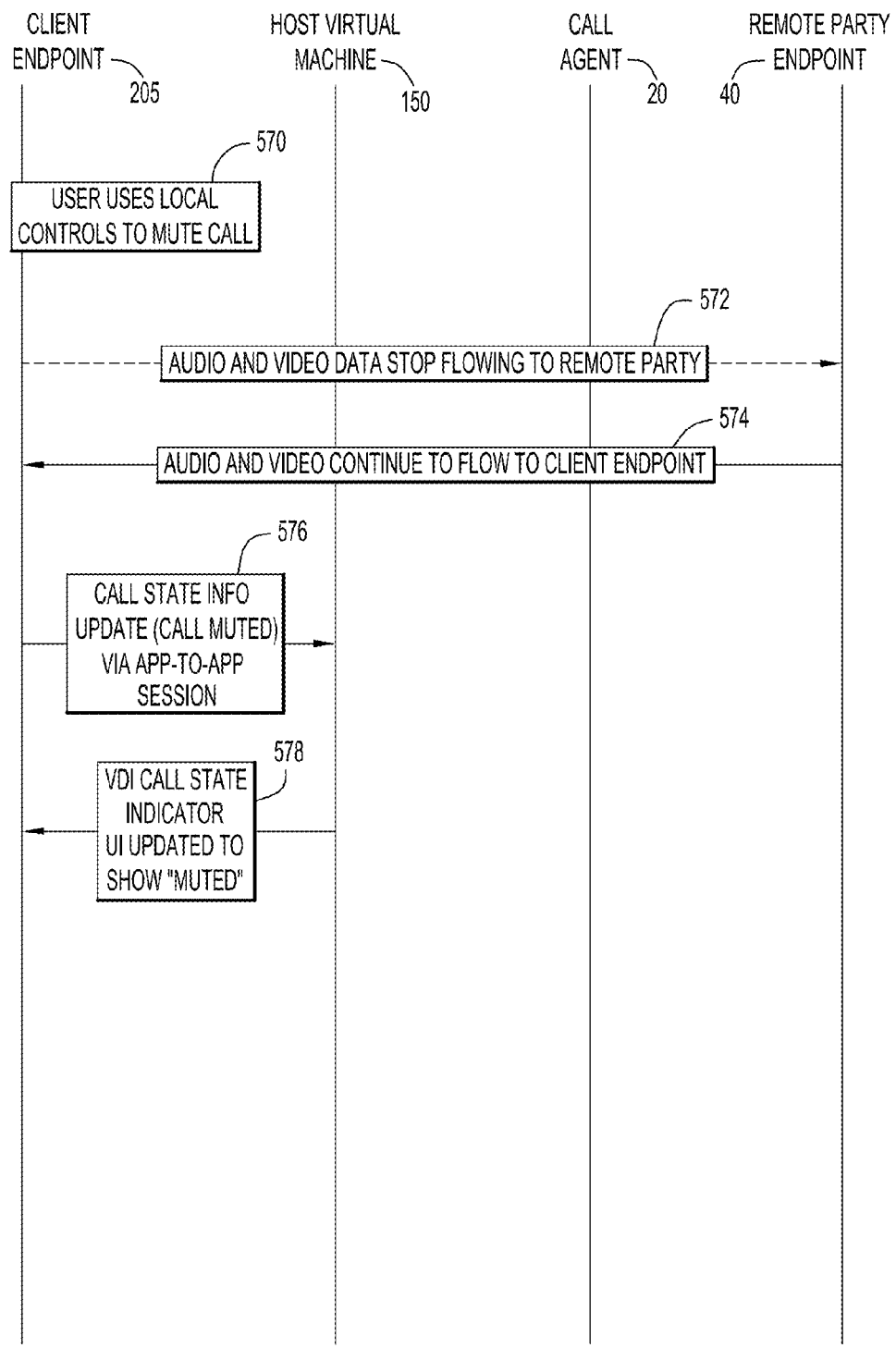
FIG. 6 is an example of a call flow in which user uses a local mute control to mute a UC call session between a client endpoint device and a remote party endpoint.

FIG. 6 is an example of a call flow in which user uses a local mute control 645 to mute an established UC call session between a client endpoint device 205 and a remote party endpoint 40. In step 570 a user uses a local control 645, rendered directly on the client endpoint 205, to mute the call, and in step 572 the media transfer session 435 is muted to stop the flow of audio and video data from the client endpoint 205 to the remote party endpoint 40, while in step 574 audio and video data continues to flow from the remote party endpoint 40 to the client endpoint 205. In step 576 the client endpoint 205 sends a call state information update (call is muted) to the HVD 150 via the application-to-application session 440, and in step 578 after the host UC application 320 updates the GUI to reflect that the call is now muted, the VDI server 310 sends the GUI update over VDI Session 350, where VDI client 350 uses operating system 355 to update the display 250.

Figure 7:
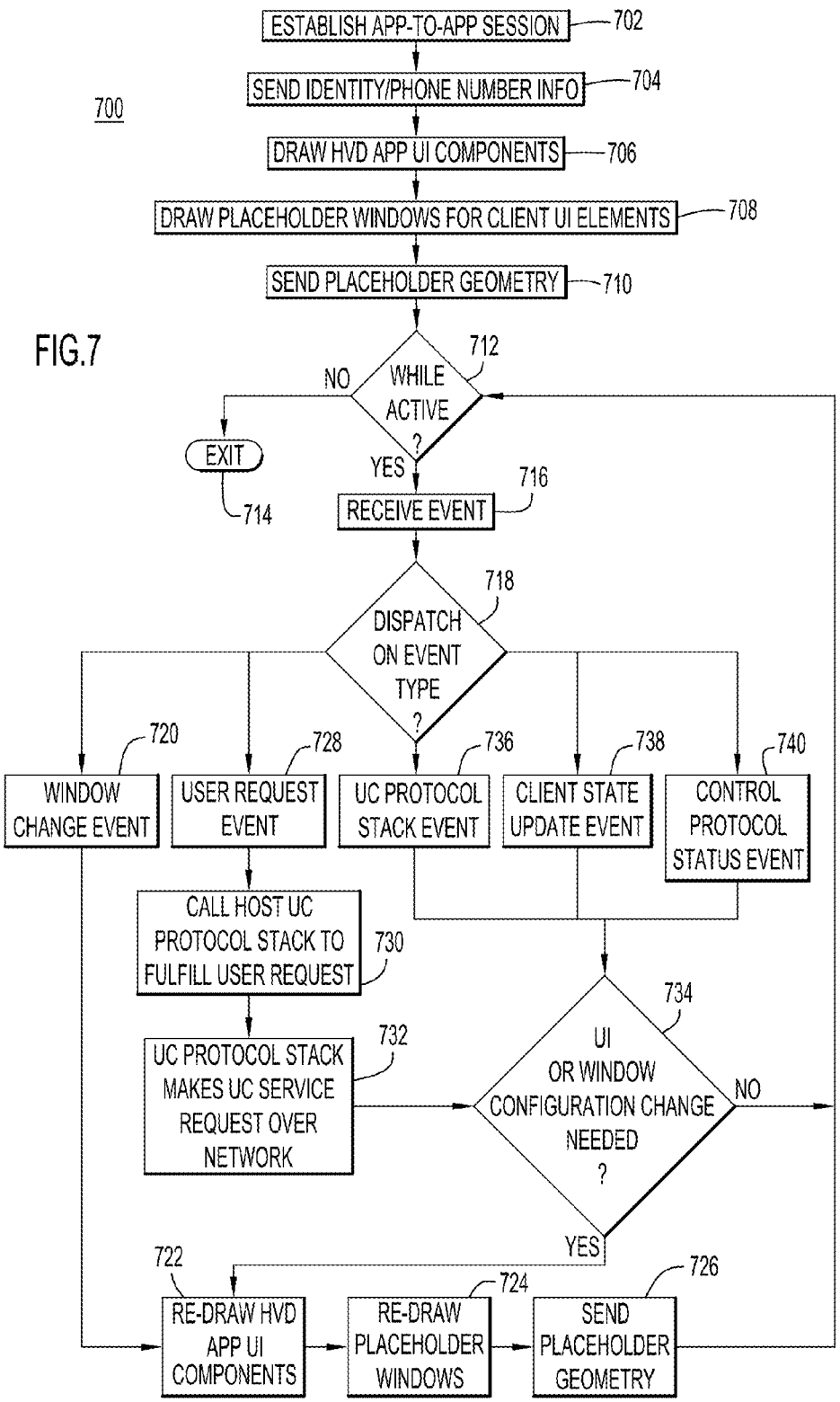
FIG. 7 is an example of a flow chart generally depicting management of application-to-application and UC control sessions by the HVD.

FIG. 7 is an example of a flow chart generally depicting process 700 for the management of application-to-application and UC control sessions by the host UC application 320. In step 702 the host UC application 320 establishes an application-to-application session 440 with the client UC application 360, and in step 704, the host UC application 320 sends identity and phone number information to the client UC application 360. In step 706, the host UC application 320 draws the host-provided user interface elements of the UC user interface to the HVD display, and in step 708 the host UC application 320 draws the placeholders for the client-provided user interface elements of the UC user interface. If chromakey is used, then at this time the host UC application 320 fills the placeholders with a chromakey color. It will be understood that, when the UC application 320 draws UI components, it is merely requesting of the operating system 315 that the UI elements be rendered, and as a result, the VDI server will transmit images of those components to the client endpoint 205, as part of the HVD display via VDI session 405. In step 710, the user interface geometry information including the geometry of the placeholders is computed, taking into account any regions of other windows that fully or partially occlude the placeholders, and that geometry information is sent to the UC client application 360, via application to-application session 440.

In step 712, the host UC application 320 checks to see if it is still an active application and, if not, in step 714 the host UC application 320 exits process 700. If active, then in step 716 the host UC application 320 waits to receive an event, and in step 718 acts depending on the event type received. For example, if the received event is a window change event (step 720), for example because the user is moving or resizing the windows in the displayed user interface (e.g., a GUI) at the client endpoint 205, or because a host application needs to rearrange the windows, then in step 722 the host UC application 320 redraws the host-provided user interface elements, and in step 724 the host UC application 320 redraws the placeholders for the client-provided user interface elements. If chromakey is used, then at this time the host UC application 320 refills the placeholders with a chromakey color. Again, it will be understood that drawing these elements in the virtual display results in updates to the client display, based on information sent via the VDI session 405. In step 726, host UC application 320 re-computes the user interface geometry information including the geometry of the placeholder windows and sends it via the application-to-application session 440. The process then returns to step 712.

If, for example, the received event is a user request event (step 728), such as establishing or terminating a call or another action requested by the user interacting with the application controls, then in step 730 the host UC application 320 calls the host UC protocol stack 325 to fulfill the user request, in step 732 the host UC protocol stack 325 makes the appropriate UC service request (e.g., a CTI request) over the network, and then in step 734 the host UC application 320 determines if a change to the user interface and window configuration is needed, e.g., a call status window needs to be added to the user interface. If not, the process returns to step 712, but if yes, then the process proceeds to steps 722, 724, 726 to re-draw UI components and send placeholder geometry information, as described previously.

If the received event is a UC protocol stack event (step 736), such as the receipt of an incoming call request by the host UC protocol stack 325 or a CSF callback from a non-call-control service, then the host UC application 320 determines in step 734 whether a change to the user interface and window configuration is needed because of the event, and proceeds as described above. If the received event is a client state update event (step 738), for example the receipt of a mute notification from the client endpoint device 205 via the application-to-application session 440, then the host UC application 320 determines in step 734 whether a change to the user interface and window configuration is needed because of the event, and proceeds as described above. If the received event is a control protocol status event (step 740), for example the receipt of a CSF callback from the call control system, e.g., a CTI status event such as a call notification, then the host UC application 320 determines in step 734 whether a change to the user interface and window configuration is needed because of the event, and proceeds as described above.

Figure 8A:
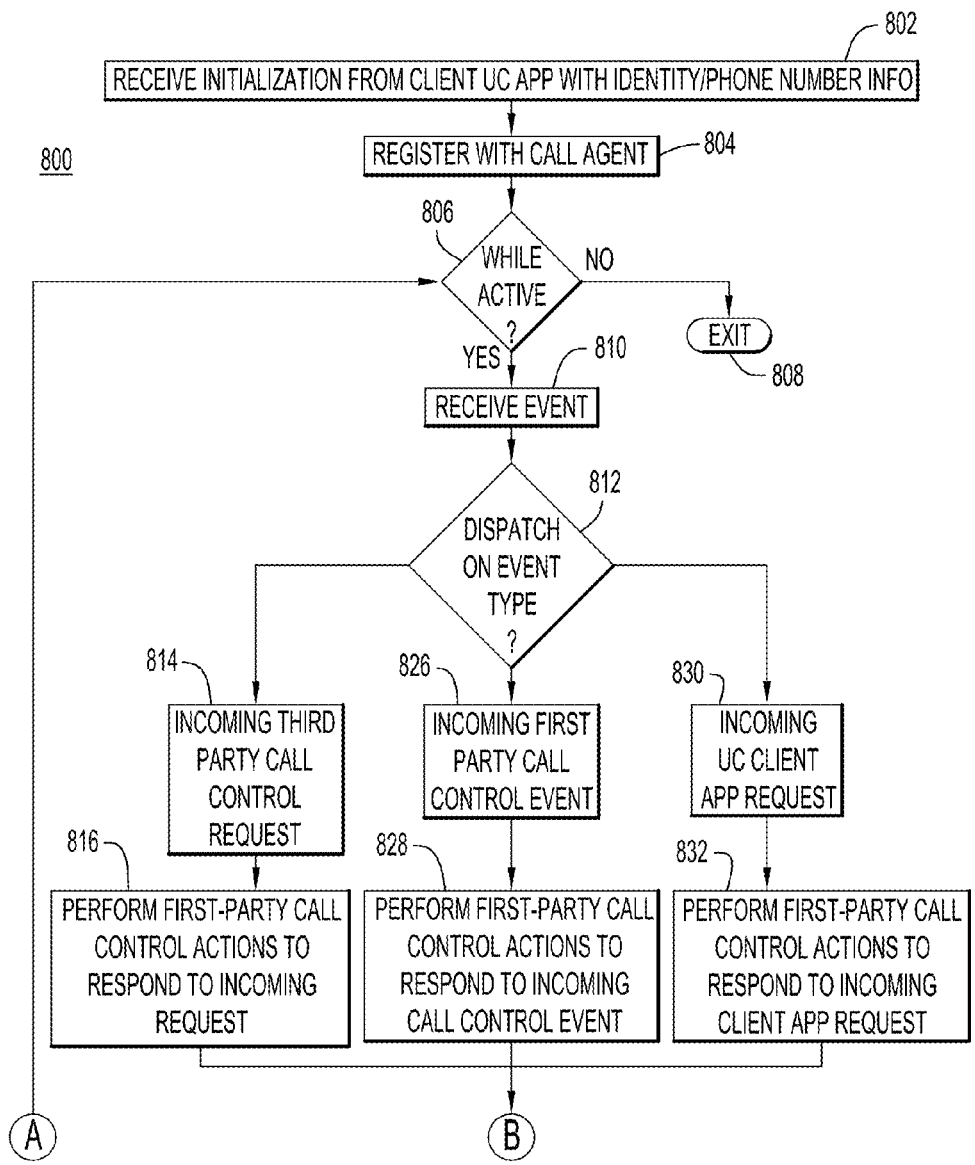
FIGS. 8A and 8B depict an example of a flow chart generally depicting establishment and operations of UC call and control sessions by a protocol stack at the client endpoint device.
Figure 8B:
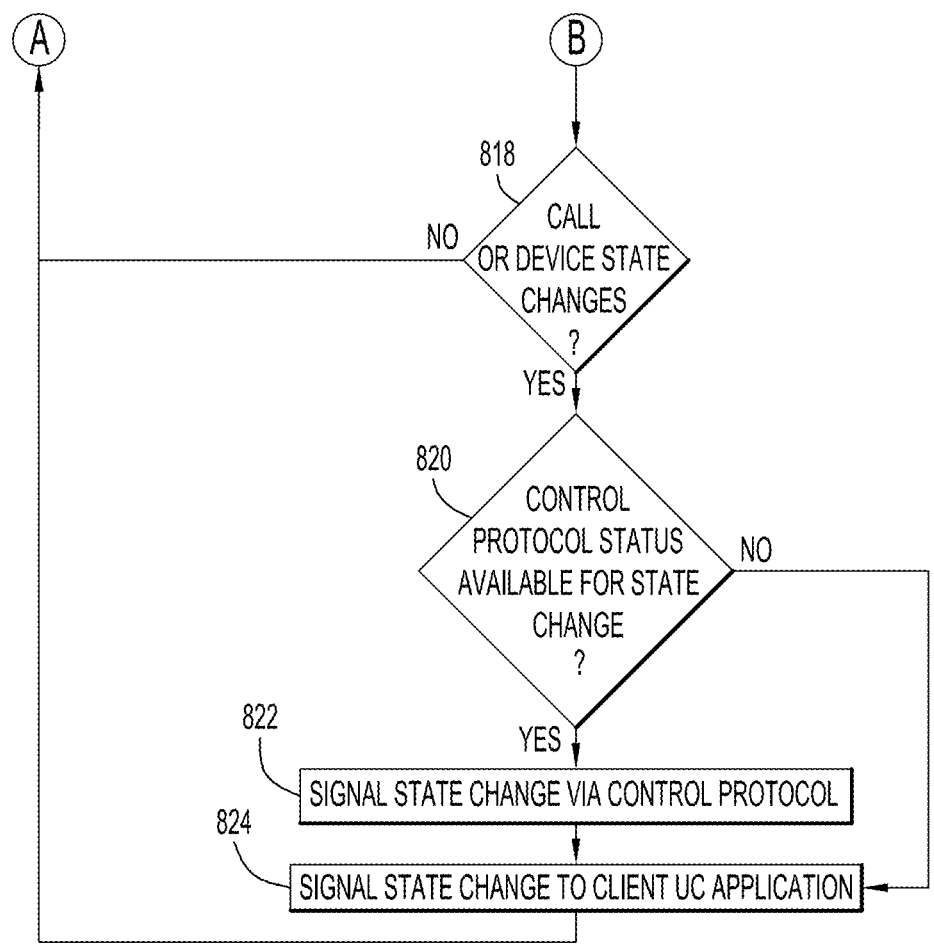

FIGS. 8A and 8B depict an example of a flow chart generally depicting process 800 for the establishment and operations of UC call and control sessions by the client UC protocol stack 365 at the client endpoint device 205. In step 802 the client UC protocol stack 365 receives initialization information such as identity and phone number information from the client UC application 360, and in step 804 the client UC protocol stack 365 uses the initialization information to register with the call agent 20. In step 806, the client UC protocol stack 365 checks to see if the UC client application 360 is still executing, and if not, in step 808 the client UC protocol stack 365 exits process 800. If active, then in step 810 the client UC protocol stack 365 receives an event, and in step 812 acts depending on the event type received.

For example, if the received event is an incoming third party call control request (step 814), such as an incoming CTI request or receipt of a remoteCC body via a protocol such as SIP (e.g., a SIP REFER request with a remoteCC body requesting a call be placed), then in step 816 the client UC protocol stack 365 performs first-party call control actions to respond to the incoming request, and proceeds to step 818. In step 818, the client UC protocol stack 365 determines if there are any call or device state changes, and if not returns to step 806. If yes, then in step 820 the client UC protocol stack 365 determines if there is a control protocol status (e.g., a CTI status) available for the state change. If yes, then in step 822 the client UC protocol stack 365 signals the state change via the control protocol to call agent 20, and then in step 824 the client UC protocol stack 365 signals the state change to the client UC application 360, and then returns to step 806. If at step 820 the answer is no, then the process proceeds to step 824 and then to step 806, as previously described.

If, for example, the received event is an incoming first party call control event (step 826), such as a regular SIP request or response, then in step 828 the client UC protocol stack 365 performs first-party call control actions to respond to the incoming call control event, and proceeds to step 818 and onwards, as previously described. If, for example, the received event is an incoming request from the UC client application 360 (step 830), such as a CSF request to, e.g., mute audio/video, escalate video, etc., then in step 832 the client UC protocol stack 365 performs first-party call control actions to respond to the incoming request, and proceeds to step 818 and onwards, as previously described.

Figure 9:
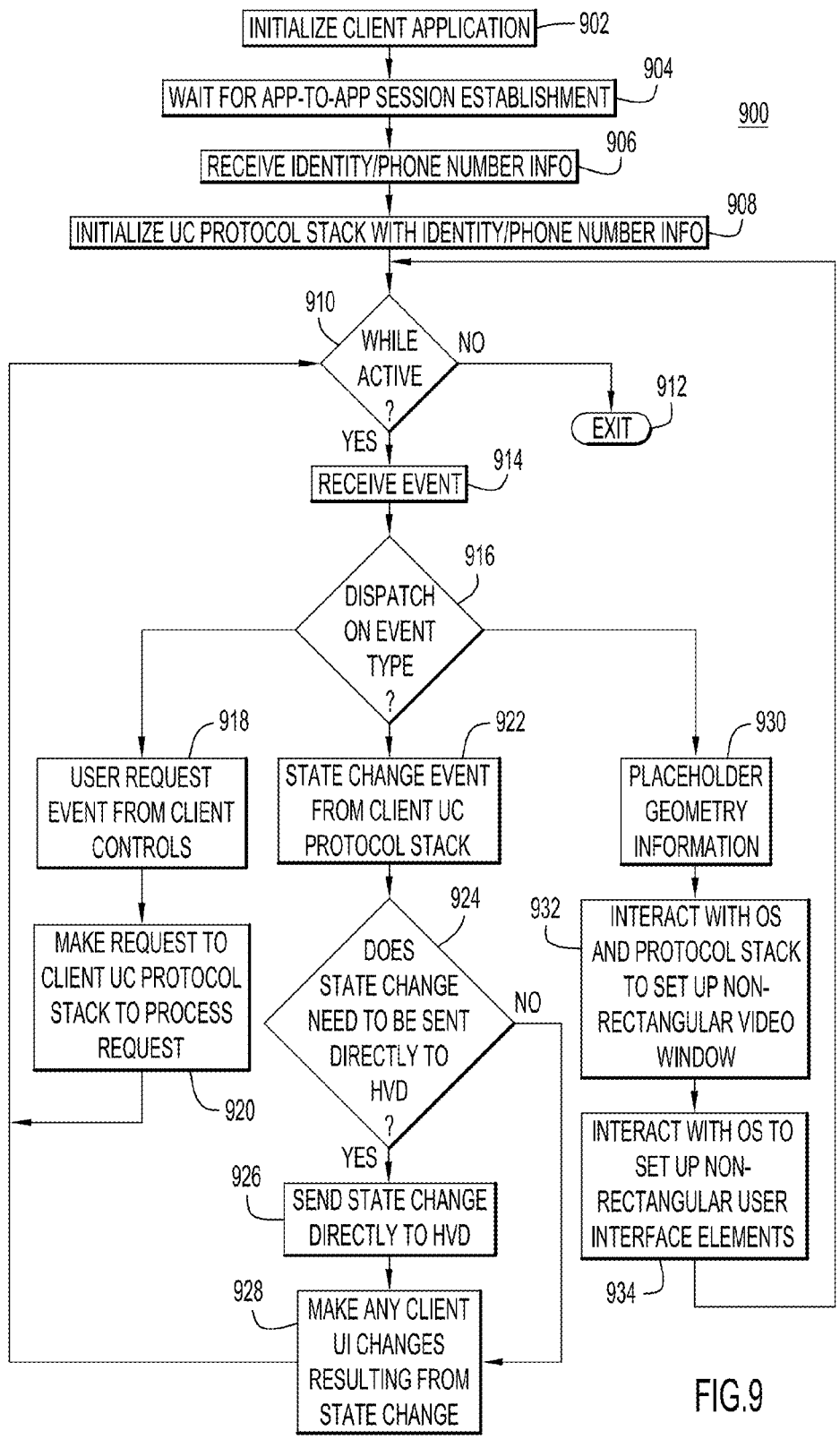
FIG. 9 is an example of a flow chart generally depicting establishment and operations of UC call and application-to-application sessions by a client UC application at the client endpoint device.

FIG. 9 is an example of a flow chart generally depicting process 900 for the establishment and operations of UC call and application-to-application sessions by a client UC application 360 at the client endpoint device 205. In step 902 the client UC application 360 is initialized. In step 904, the client UC application 360 waits for the establishment of an application-to-application session 440 by host UC application 320. In step 906, the client UC application 360 receives identity and phone number information from the host UC application 320 over the application-to-application session 440. In step 908, the client UC application 360 initializes the client UC protocol stack 365 with the identity and phone number information.

Step 910 begins a loop that will persist as long as client UC application 360 is executing. If the application has been directed to terminate, it exits at step 912. If active, then in step 914 the client UC application 360 receives an event, and in step 916 acts depending on the event type received. If, for example, the event is a user request event received from the client-provided local controls (step 918), such as a volume change or mute, then in step 920 the client UC application 360 makes a request to the client UC protocol stack 365 to process the request, and then returns to step 910.

If, for example, the event is a state change event received from the client UC protocol stack 365 (step 922), such as a CSF callback, then in step 924 the client UC application 360 determines if the state change needs to be sent to the host UC application 320, and if yes, in step 926 sends the state change to the host UC application 320, for example by the application-to-application session 440. In step 928 the client UC application 360 makes any changes to the client user interface that are necessary to respond to the state change, for example if the volume has been decreased, the appearance of the volume control may be changed, for example a volume slider may be moved, and then the process returns to step 910. If the determination at step 924 is negative, then the client UC application 360 proceeds to step 928, and then to step 910, as previously described.

If, for example, the event conveys information about user interface (e.g., placeholder) geometry from the host UC application 320 (step 930), for example the receipt of window coordinates (placeholders) for a video window or other user interface element from application-to-application session 440, then in step 932 the client UC application 360 interacts with client operating system 355 and client UC protocol stack 365 to set up a video window, if one is specified. The video window may be non-rectangular if other HVD application windows partially occlude it. In one embodiment, interaction with UC protocol stack 365 will cause video images to be rendered directly by protocol stack 365 to operating system 355, based on video image data received from media transport session 435. In step 934, the client UC application 360 creates the client-provided user interface elements in the placeholder area specified, for example by creating client-provided local controls in a specified area, and further interacts with the client operating system 355 to convey any partial occlusions by other HVD application windows. The process then returns to step 910.

In sum, techniques are provided herein for establishing a Unified Communications (UC) call session between a client endpoint device and a remote endpoint device, where the client endpoint device manages the call session using a first-party control protocol, third-party control information, and user input. A host UC application on an HVD draws an application window of a UC user interface, which a Virtual Desktop Interface (VDI) server converts to a virtual display image and communicates to the client endpoint device for display, the application window image comprising at least one host-provided user interface element and at least one placeholder where a client-provided user interface element may be inserted. A client UC application receives information about the placeholder geometry and composites client-provided user interface elements into the VDI image before displaying an integrated display image of a UC user interface at the client endpoint device.

The above description is intended by way of example only. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed.

With respect to the Figures, which illustrate the architecture, functionality, and operation of possible implementations of methods, apparatuses, and computer readable media encoded with instructions for creating, managing and displaying an integrated user interface for UC applications on a client endpoint device, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method comprising:
 establishing a client Unified Communications (UC) application on a client endpoint device;
 receiving a hosted virtual desktop (HVD) display comprising a UC user interface from a hosted virtual desktop (HVD) host at the client UC application, the UC user interface comprising a host-provided user interface element including one or more host-provided controls for managing a UC call session and one or more placeholders, each placeholder for a client-provided user interface element including a video element placeholder;

modifying the received HVD display by commanding a client operating system of the client endpoint device to insert the client-provided user interface element into each placeholder on the HVD display, prior to rendering the client-provided user interface element for display, to produce a modified HVD display;

generating a client endpoint display by rendering the modified HVD display;

establishing the UC call session between the client endpoint device and a remote endpoint device; and displaying the client endpoint display, which comprises the one or more host-provided controls and each client-provided user interface element to enable a user to manage the UC call session between the client endpoint device and the remote endpoint device using the UC user interface.

2. The method of claim 1, further comprising:
receiving third-party control information associated with the UC call session via a third party control protocol session; and
managing the UC call session using a first-party control protocol.

3. The method of claim 2, wherein the third party control information is received via a UC control connection between a UC protocol stack on the client endpoint device and a call agent, wherein the UC control connection is configured to allow the UC protocol stack to register with the call agent, and to send or receive commands from the call agent that are based on signals from a UC control application running on the HVD host.

4. The method of claim 1, further comprising:
communicating rich media data associated with the UC call session between the client endpoint device and the remote endpoint device without passing through the HVD host.

5. The method of claim 4, wherein the rich media data comprises audio data, video data, or a combination of audio and video data.

6. The method of claim 1, wherein the generating of the client endpoint display further comprises rendering the HVD display into a first client window, and rendering the at least one client-provided user interface element into a second client window that always has a higher z-order than the first client window.

7. The method of claim 1, further comprising:
sending a notification of a changed client state to the HVD; and
receiving a new HVD display comprising the UC user interface from the HVD at the client UC application.

8. The method of claim 1, wherein the UC user interface further comprises a placeholder where the at least one client-provided user interface element may be rendered, and wherein the generating of the client endpoint display further comprises rendering the at least one client-provided user interface element over the placeholder of the received HVD display.

9. The method of claim 8, further comprising:
the client endpoint device communicating additional information with a host UC application on the HVD host via an application-to-application protocol.

10. The method of claim 9, wherein the additional information comprises identity information received by the client UC application from the host UC application, and wherein the identity information enables the client UC application to register the client endpoint device with a call agent.

11. The method of claim 9, wherein the additional information comprises call state and client state information.

12. The method of claim 9, wherein the additional information comprises user interface geometry information received by the client UC application from the host UC application, said user interface geometry information comprising one or more of the following:
position of placeholder user interface elements;
size of placeholder user interface elements; and
descriptions of regions of the placeholder that are occluded by other HVD applications in the HVD display.

13. The method of claim 9, further comprising:
establishing a Virtual Desktop Interface (VDI) connection between a VDI client in the client endpoint device and a VDI server in the HVD host, wherein the application-to-application protocol is transported as a virtual channel in the VDI connection.

14. The method of claim 8, wherein the HVD display further comprises an application window, wherein the placeholder may be partially occluded by the application window in the HVD display, and wherein the generating of the client endpoint display further comprises rendering the client-provided user interface element into the portion of the placeholder that is not occluded by the application window.

15. The method of claim 1, wherein the HVD host is a hosted virtual application (HVA) host, and wherein the hosted virtual desktop (HVD) display is a hosted virtual application (HVA) display.

16. An apparatus comprising:
a display device; and
a processor configured to:
establish a client Unified Communications (UC) application;
receive a hosted virtual desktop (HVD) display comprising a UC user interface from a hosted virtual desktop (HVD) host at the client UC application, the UC user interface comprising a host-provided user interface element including one or more host-provided controls for managing a UC call session and one or more placeholders, each placeholder for a client-provided user interface element including a video element placeholder;
modify the received HVD display by commanding a client operating system of the client endpoint device to insert the client-provided user interface element into each placeholder on the HVD display, prior to rendering the one or more client-provided user interface elements for display, to produce a modified HVD display;
generate a client endpoint display by rendering the modified HVD display;
establish the UC call session between the apparatus and a remote endpoint device; and
display the client endpoint display, which comprises the one or more host-provided controls and each client-provided user interface element, on the display device to enable a user to manage the UC call session between the client endpoint device and the remote endpoint device using the UC user interface.

17. The apparatus of claim 16, wherein the at least one client-provided user interface element comprises a graphical user interface control.

18. The apparatus of claim 16, wherein the apparatus is a thin client or a personal computer.

19. The apparatus of claim 16, wherein the apparatus is communicably connected to a video-incapable phone and wherein the apparatus enables a user to view video associated with the UC call session on the display device while hearing audio associated with the UC call session on the video-incapable phone.

20. One or more non-transitory computer readable media encoded with instructions that, when executed by a processor, cause the processor to:

establish a client Unified Communications (UC) application on a client endpoint device;

receive a hosted virtual desktop (HVD) display comprising a UC user interface from a hosted virtual desktop (HVD) host at the client UC application, the UC user interface comprising a host-provided user interface element including one or more host-provided controls for managing a UC call session and one or more placeholders, each placeholder for a client-provided user interface element including a video element placeholder;

modify the received HVD display by commanding a client operating system of the client endpoint device to insert the client-provided user interface element into each placeholder on the HVD display, prior to rendering the client-provided user interface element for display, to produce a modified HVD display;

generate a client endpoint display by rendering the modified HVD display;

establish the UC call session between the client endpoint device and a remote endpoint device; and display the client endpoint display, which comprises the one or more host-provided controls and each client-provided user interface element to enable a user to manage the UC call session between the client endpoint device and the remote endpoint device using the UC user interface.

21. The non-transitory computer readable media of claim 20, further comprising instructions that when executed cause the processor to:

communicate rich media data associated with the UC call session between the client endpoint device and the remote endpoint device without passing through the HVD host.

22. The non-transitory computer readable media of claim 20, wherein the UC user interface further comprises a placeholder where the at least one client-provided user interface element may be rendered, and wherein the instructions that cause the processor to generate the client endpoint display comprise instructions that when executed cause the processor to:

render the at least one client-provided user interface element over the placeholder of the received HVD display.

23. The non-transitory computer readable media of claim 22, wherein the HVD display further comprises an application window, the placeholder may be partially occluded by the application window in the HVD display, and wherein the instructions that cause the processor to generate the client endpoint display comprise instructions that when executed cause the processor to:

render the client-provided user interface element over the portion of the placeholder that is not occluded by the application window.

\* \* \* \* \*